(12) United States Patent
Fews et al.

(10) Patent No.: US 8,998,134 B2
(45) Date of Patent: Apr. 7, 2015

(54) FIBER-REINFORCED, COMPOSITE, STRUCTURAL MEMBER EXHIBITING NON-LINEAR STRAIN-TO-FAILURE AND METHOD OF MAKING SAME

(75) Inventors: Robert Clive Fews, Beaconsfield (CA); Bijan Derisi, Montreal (CA); Suong Van Hoa, Brossard (CA); Mehdi Hojjati, Dollard-des-Ormeaux (CA)

(73) Assignee: Textron Innovations Inc., Providence, RI (US)

( * ) Notice: Subject to any disclaimer, the term of this patent is extended or adjusted under 35 U.S.C. 154(b) by 1141 days.

(21) Appl. No.: 12/999,227

(22) PCT Filed: Jun. 19, 2009

(86) PCT No.: PCT/US2009/048020
§ 371 (c)(1),
(2), (4) Date: May 18, 2011

(87) PCT Pub. No.: WO2009/155553
PCT Pub. Date: Dec. 23, 2009

(65) Prior Publication Data
US 2011/0210201 A1   Sep. 1, 2011

(30) Foreign Application Priority Data
Jun. 20, 2008   (CA) .................................... 2635524

(51) Int. Cl.
*B64C 25/52*   (2006.01)
*B64C 25/32*   (2006.01)

(52) U.S. Cl.
CPC .......... *B64C 25/52* (2013.01); *B64C 2025/325* (2013.01)

(58) Field of Classification Search
USPC ................................................. 244/108, 133
See application file for complete search history.

(56) References Cited

U.S. PATENT DOCUMENTS

| | | | |
|---|---|---|---|
| 5,224,669 A * | 7/1993 | Guimbal | 244/108 |
| 5,236,018 A * | 8/1993 | Kobayashi et al. | 138/172 |
| 5,358,583 A | 10/1994 | Hatchadoorian et al. | |
| 6,244,538 B1 * | 6/2001 | Howard et al. | 244/17.17 |
| 6,641,893 B1 * | 11/2003 | Suresh et al. | 428/105 |
| 8,541,091 B2 * | 9/2013 | Kismarton | 428/113 |
| 2006/0284009 A1 * | 12/2006 | Kismarton | 244/104 LS |

OTHER PUBLICATIONS

International Search Report mailed by ISA/US on Aug. 31, 2009 for PCT/US09/48020.

(Continued)

*Primary Examiner* — Tien Dinh
*Assistant Examiner* — Steven Hawk
(74) *Attorney, Agent, or Firm* — James E. Walton

(57) ABSTRACT

A fiber-reinforced, organic matrix, composite structural member includes a plurality of layers of fiber-reinforced, organic matrix, composite material in which adjacent layers are bonded to one another, wherein the structural member exhibits a non-linear stress-strain response when mechanically loaded to failure. A helicopter landing gear includes a pair of skids and one or more cross members extending between the pair of skids. The one or more cross members includes a plurality of layers of fiber-reinforced, organic matrix, composite material in which adjacent layers are bonded to one another, wherein the cross members exhibit non-linear stress-strain responses when mechanically loaded to failure.

14 Claims, 4 Drawing Sheets

(56) References Cited

OTHER PUBLICATIONS

European Search Report dated Jul. 16, 2013 from counterpart EP App. No. 09767862.7.
European Search Report dated Feb. 20, 2013 from counterpart EP App. No. 09767862.7.
Canadian Office Action dated Jan. 22, 2013 from counterpart CA App. No. 2,635,524.
Canadian Office Action dated Aug. 30, 2013 from counterpart CA App. No. 2,635,524.

* cited by examiner

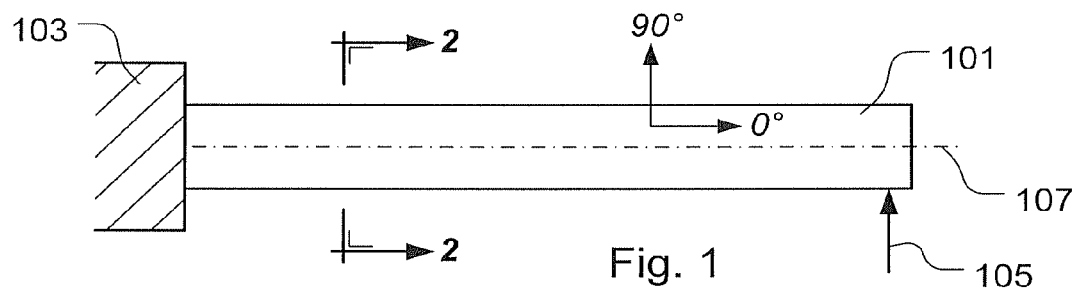
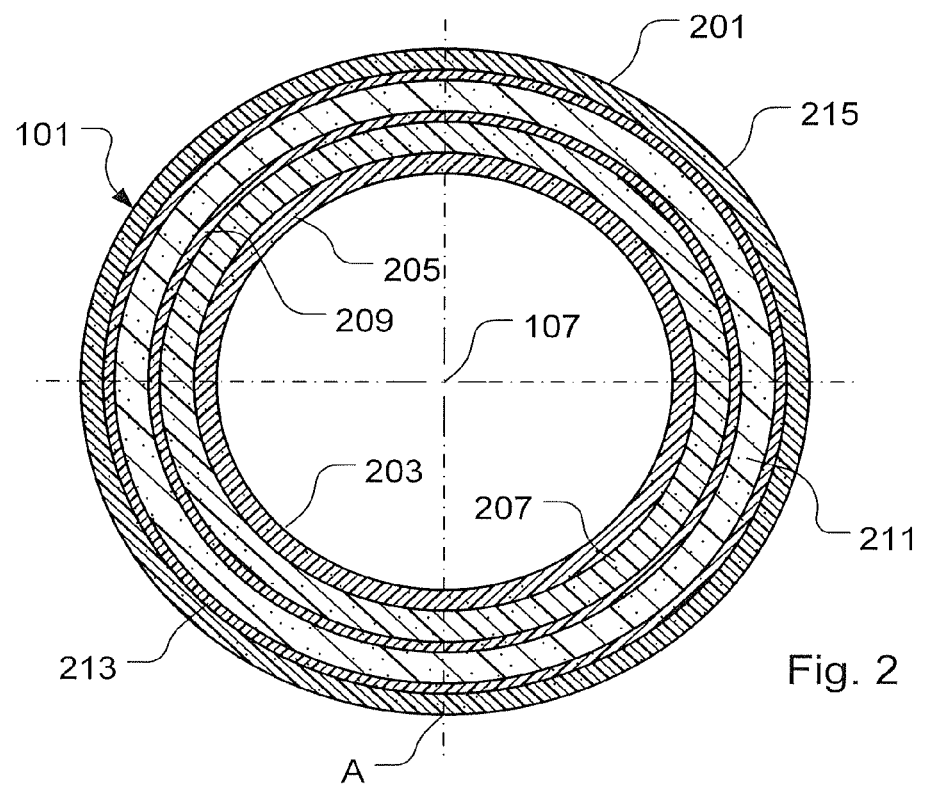

FIBER-REINFORCED, COMPOSITE, STRUCTURAL MEMBER EXHIBITING NON-LINEAR STRAIN-TO-FAILURE AND METHOD OF MAKING SAME

TECHNICAL FIELD

The present invention relates to composite structural components, such as composite structural components for helicopter landing gears.

DESCRIPTION OF THE PRIOR ART

Generally, it is desirable for a structural member to be made from a material that exhibits a maximum strain-to-failure of at least several percent, so the structural member will deform at least somewhat plastically at failure, rather than exhibiting a purely brittle failure. Certain metals and metallic alloys, such as certain aluminum and iron alloys, are typically used in such structural members. In certain implementations, however, it is very desirable to decrease the weight of a structural member. While fiber-reinforced composite materials seem to be a likely way to decrease the weight of the structural member, conventional fiber-reinforced composite materials exhibit maximum strains-to-failure of less than about one percent. Thus, structural members made from such conventional fiber-reinforced composite materials exhibit substantially brittle failure.

For example, conventional skid-type landing gears for helicopters typically include aluminum cross tubes that both sustain normal landing loads and deform plastically during a crash to absorb energy and reduce vehicle accelerations. It is desirable, however, to reduce the weight of a helicopter wherever possible. Conventional fiber-reinforced composite skid-type landing gear configurations, though promising far superior damage tolerance in normal operation, have not been successfully employed in helicopters due to their linear stress strain curve to failure and, consequently, their inability to absorb plastic energy in a crash.

There are many designs of structural components well known in the art, however, considerable shortcomings remain.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIG. 1 is a stylized, side, elevational view of a fiber-reinforced, organic matrix, composite structural member;

FIG. 2 is a cross-sectional view of the composite structural member of FIG. 1, taken along the line 2-2 in FIG. 1;

Figure 3:
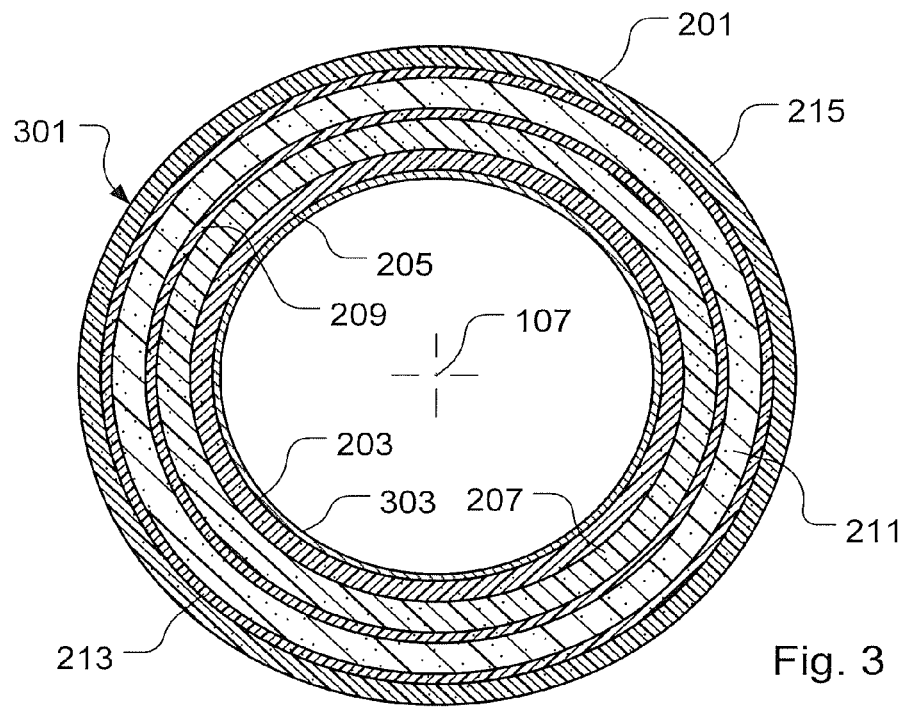
FIG. 3 is a cross-sectional view of an illustrative embodiment of a composite structural member alternative to that of FIG. 2.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present invention represents a fiber-reinforced, organic matrix, composite structural member that exhibits a non-linear stress-strain response when mechanically loaded to failure. In one embodiment, the composite structural member exhibits a maximum strain-to-failure of more than about one percent and, more preferably, exhibits a maximum-strain-to-failure of more than about three percent. Such strain-to-failure characteristics are achieved by tailoring the composite structural member so that none of the reinforcing fibers are oriented parallel to the mechanical loading direction of the structural member.

FIG. 1 depicts a fiber-reinforced, organic matrix, composite structural member 101 that exhibits a non-linear stress-strain response when mechanically loaded to failure. In the illustrated embodiment, structural member 101 exhibits a tubular form. For the purposes of this disclosure, the term "tubular" encompasses forms that are substantially circular in cross-section as well as forms that are not circular in cross-section, such as oval, elliptical, and the like. It should be noted, however, that the present invention contemplates other forms, for example, "open" forms, such as forms that are "C-shaped" or "U-shaped" in cross-section. The scope of the present invention encompasses any structural member that is comprised of a plurality of layers that exhibit non-linear stress-strain behavior through progressive ply failure. Structural member 101 comprises reinforcing fibers disposed in a polymeric matrix and preferably disposed in a high strain-to-failure polymeric matrix. In one embodiment, structural member 101 comprises graphite or carbon reinforcing fibers, such as AS4 carbon reinforcing fibers, disposed in a thermoplastic, polymeric matrix, such as a matrix of poly-ether-ketone-ketone (PEKK) thermoplastic resin. The present invention contemplates other reinforcing fibers, such as glass or aramid fibers, and contemplates other polymeric matrices, such as thermosetting polymeric matrices, for example, an epoxy matrix. The reinforcing fibers are disposed in discrete layers, preferably using an automated fiber placement process, that comprise unidirectional fibers, rather than fibers that are woven, braided, or the like, although discrete layers may include fibers oriented in different directions.

Generally, composite structural member 101 comprises no or few reinforcing fibers that are generally aligned with a loading direction of structural member 101. In the implementation of composite structural member 101 shown in FIG. 1, structural member 101 operates as a beam cantilevered from a substantially fixed object 103. When a force as indicated by an arrow 105 is applied to composite structural member 101, composite structural member 101 is loaded along a longitudinal axis 107 of composite structural member 101. Accordingly, in the exemplary implementation illustrated in FIG. 1, composite structural member 101 includes no or few reinforcing fibers that are generally parallel to longitudinal axis 107, i.e., in a zero degree direction. Rather, composite structural member 101 comprises reinforcing fiber that are oriented in other directions, such as, for example, ±20 degrees, ±30 degrees, ±45 degrees, ±90 degrees, or the like, with respect to longitudinal axis 107. It has been discovered that such layers exhibit substantial nonlinear elastic behavior. For example, it has been discovered that such laminates are capable of showing higher fracture strain as the fiber orientation angle increases from zero degrees toward 45 degrees.

It has been discovered that, in layers containing reinforcing fibers oriented in directions other than the loading direction of structural member 101, the reinforcing fibers change their orientations slightly, thus shearing the polymeric matrix to allow deformation. It has been discovered that, in a ±30 degree laminate, the reinforcing fibers can rotate about four degrees under the action of the force. While the reinforcing fibers are adjusting their direction, structural member 101 experiences large deformation and higher fracture strain is achieved. Furthermore, the high strain-to-failure polymeric matrix, which is loaded in shear in such a situation, exhibits plastic deformation. It has also been discovered that, even though 90 degree layers fail due to crack propagation parallel to the reinforcing fibers, such layers are still capable of carrying mechanical loads in the circumferential direction. In other words, when a 90 degree layer fails, it has little if any resistance in an axial direction, i.e., generally parallel to longitudinal axis 107, and the layer behaves like a gap between adjacent layers.

FIG. 2 depicts a cross-sectional view of composite structural member 101 taken along a line 2-2 in FIG. 1. In the illustrated embodiment, composite structural member 101 is a tubular member defining an outer surface 201 and an inner surface 203. Inner surface 203 defines a cavity or passageway in composite structural member 101. As depicted in FIG. 2, composite structural member 101 comprises a plurality of layers 205, 207, 209, 211, 213, and 215, although the present invention contemplates any suitable number of layers, as the number of layers is implementation specific. In the illustrated embodiment, layers 205, 209, and 213 comprise reinforcing fibers oriented at substantially 90 degrees with respect to longitudinal axis 107. Layer 207 comprises reinforcing fibers that are oriented at substantially ±25 degrees with respect to longitudinal axis 107. Layer 211 comprises reinforcing fibers that are oriented at substantially ±30 degrees with respect to longitudinal axis 107. Layer 215 comprises reinforcing fibers that are oriented at substantially ±45 degrees with respect to longitudinal axis 107. Layers 205, 209, and 213 are provided to separate layers 207, 211, and 215 from one another an allow layers 207, 211, and 215 to move along longitudinal axis 107 upon failure of composite structural member 101. In the illustrated embodiment, layers 205 and 207 each include about 20 plies of fiber-reinforced material, while layers 209 and 213 each include about five plies of fiber-reinforced material. Layer 211 includes about 25 plies of fiber-reinforced material and layer 215 includes about 10 plies of fiber-reinforced material. The present invention, however, contemplates other ply counts in each of layers 205, 207, 209, 211, 213, and 215.

Progressive failure of composite structural member 101 is key to large deformation of composite structural member 101. For example, if composite structural member 101 were isotropic, the maximum stress would occur at the maximum strain sections of composite structural member 101. However, different layers of composite structural member 101 exhibit different stiffnesses and strengths, so inner layers, e.g., layers 207, 211, or the like, may carry more stress or fail earlier than outer layers, such as layers 205, 215, or the like. Outer layer 215 contributes to the torsional stiffness of composite structural member 101; however, the high fracture strain of outer layer 215 allows structural member 101 to retain its integrity even after all inner layers, e.g., layers 207, 209, 211, and 213, have structurally failed.

An exemplary progressive failure of composite structural member 101 as the maximum strain is increased is now discussed with reference to FIG. 2. Generally, outer layer 215 is subjected to larger strains than inner layers 207, 209, 211, and 213. Thus, for example, plies in layer 207 may experience higher axial strains than plies in layer 205. The maximum axial strain that can be supported by plies in, for example, layers 205 and 207, however, depend upon the relative orientation of the fibers in these layers. For example, the maximum axial strain for layers 205, 209, and 213, which have reinforcing fibers oriented at substantially 90 degrees with respect to longitudinal axis 107, is less than the maximum axial strain for layer 207, which has reinforcing fibers oriented at substantially ±25 degrees with respect to longitudinal axis 107. The maximum axial strain for layer 207 is less than the maximum axial strain for layer 211, which has reinforcing fibers oriented at substantially ±30 degrees with respect to longitudinal axis 107. The maximum axial strain for layer 211 is less than the maximum axial strain for layer 215, which has reinforcing fibers oriented at substantially ±45 degrees with respect to longitudinal axis 107.

At about 0.8 percent strain at a point A in layer 215, layer 213 fails due to transverse stress and detaches from layer 215 and from layer 211 in the tension zone. Layer 209, at about 0.9 percent strain at point A, and layer 205, at about 1.1 percent strain at point A, experience crack propagation parallel to the reinforcing fibers and fail in the axial direction but continue to resist loads in the circumferential direction. When the load and strain is increased to about 1.5 percent at point A, the strains created by the loads exceed the maximum limit strain of plies in of layer 215; however, stresses in directions normal to and parallel to the reinforcing fibers are low. While local buckling and delamination occurs, composite structural member 101 remains capable of carrying mechanical loads. The main fracture occurs when the maximum strain is beyond about 1.6 percent at point A. At this stage, layer 211 fails in the compression zone; however, layer 211 is restricted by layers 207 and 215 and, accordingly, composite structural member 101 will resist further loads until an adjacent layer fails. The final stage failure occurs when the mechanical loading exceeds the compression strength of layer 207 due to the axial load of structural member 101, at about 1.8 percent strain at point A.

Figure 4:
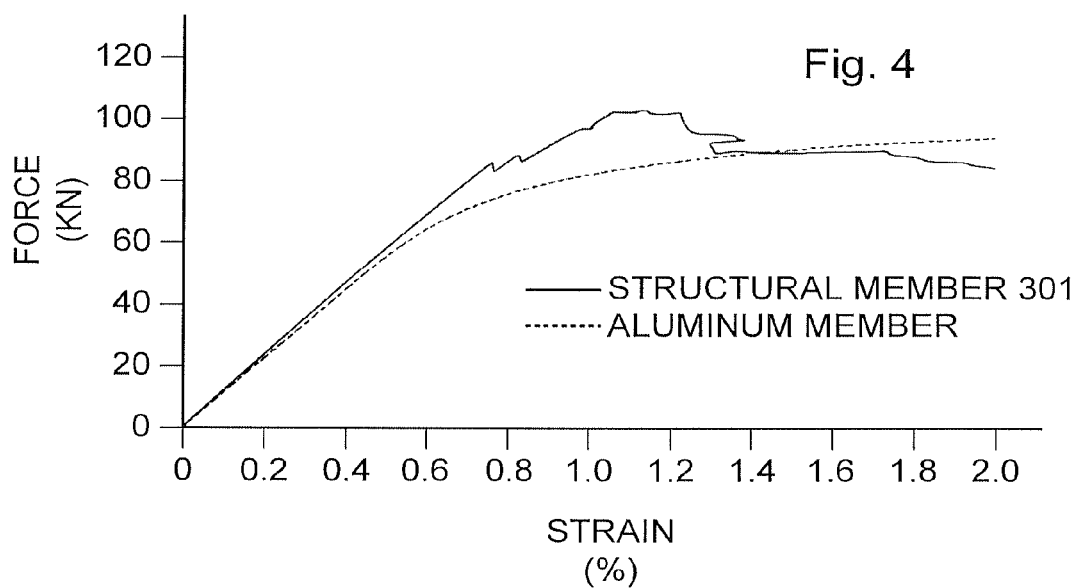
FIG. 4 is a graph representing force versus strain for the composite structural member of FIG. 3.

In an embodiment alternative to that of FIG. 2, a composite structural member 301, shown in FIG. 3, corresponds to composite structural member 101 except that an insert 303 is disposed adjacent inner surface 203 of layer 205. In the illustrated embodiment, insert 303 is a thin tube comprising an aluminum alloy and having a nominal thickness of about 1.8 millimeters. Insert 303 inhibits layer 205 from collapsing inward, which, in some implementations, allows composite structural member 301 to maintain its load carrying capacity beyond about 2 percent strain. FIG. 4 provides a graph of force versus strain for composite structural member 301 and a corresponding structural member made from 7075-T6 aluminum. Composite structural member 301 matches the strength and stiffness of the aluminum member while the required fracture strain and a similar level of energy absorption are satisfied.

Figure 5:
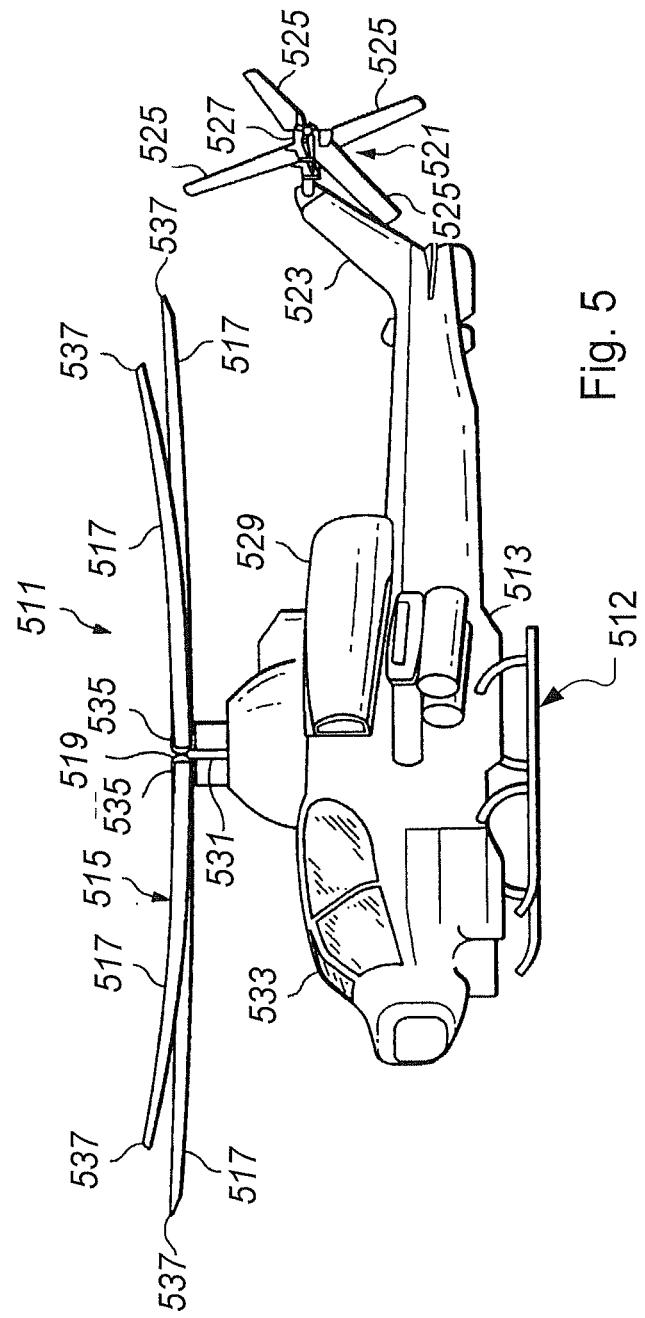
FIG. 5 is a perspective view of a helicopter incorporating the composite structural member in a landing gear thereof.

While composite structural member 101 may be used in any suitable implementation, composite structural member 101 is particularly useful in a helicopter landing gear. Referring to FIG. 5 in the drawings, a helicopter 511 having a helicopter landing gear 512 according to the present invention is illustrated. Helicopter 511 includes a fuselage 513 and a main rotor 515. Main rotor 515 includes a plurality of main rotor blades 517 that are coupled to one or more rotor yokes 519 and a drive mast 531. Torque imparted to fuselage 513 by main rotor 515 is counteracted by a tail rotor 521 carried by a tail portion 523 of fuselage 513. Tail rotor 521 includes a plurality of tail rotor blades 525 that are coupled to a tail rotor hub 527. Main rotor 515 and tail rotor 521 are powered by a drive means 529 under the control of a pilot in a cockpit 533. Each rotor blade 517 has an inboard root end 535 and an opposing outboard blade tip 537. The root end 535 of each rotor blade 517 is coupled to one of rotor yokes 519.

Figure 6:
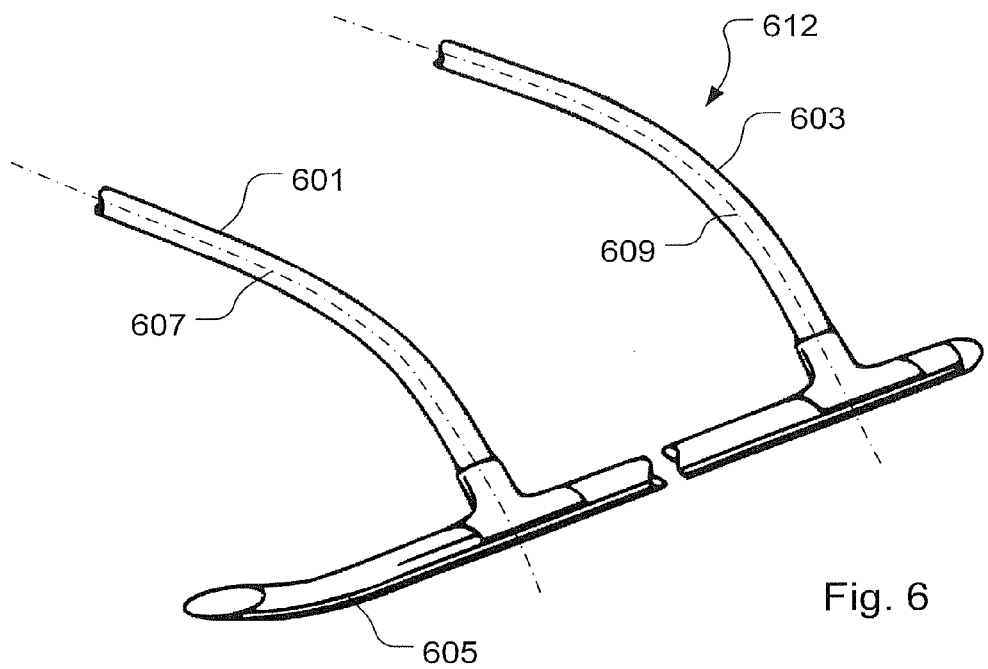
FIG. 6 is an enlarged view of a portion of the landing gear of FIG. 5.

FIG. 6 depicts an illustrative embodiment of landing gear 512 of FIG. 5. Note that only a portion of landing gear 512 is shown in FIG. 6 for clarity. In the illustrated embodiment, landing gear 512 comprises a first cross member 601 and a second cross member 603. Cross members 601 and 603 extend between a first skid 605 and a second skid (only shown in FIG. 5). In the illustrated embodiment, cross members 601 and 603 are made from a fiber reinforced composite material, such as described herein, having no or few reinforcing fibers that are generally aligned with a loading directions of cross members 601 and 603. Generally, the loading directions of cross members 601 and 603 are generally parallel to longitudinal axes 607 and 609, respectively. In certain embodiments, cross members 601 and 603 have constructions corresponding to composite structural members 101 or 301, as discussed herein. The high strain capabilities of cross members 601 and 603 are desirable to absorb energy if helicopter 511 makes a hard landing, such as in a crash situation.

It should be noted, however, that the scope of the present invention is not limited to helicopter landing gear. Rather, embodiments of the structural member described herein, such as structural members 101 and 301, may be suitably employed in any desired apparatus, structure, or system. For example, the structural member may be used in automotive, sports, and marine applications, as well as in civil infrastructures, and the like.

It should be noted that structural members 101 and 301 are particularly suited to manufacture by automated fiber placement methods.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below. It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A fiber-reinforced, organic matrix, composite structural member, comprising:
   a plurality of layers of fiber-reinforced, organic matrix, composite material in which adjacent layers are bonded to one another, the plurality of layers having:
      a first, innermost layer comprising reinforcing fibers oriented generally at 90 degrees with respect to a loading direction of the structural member;
      a second layer disposed on the first layer, the second layer comprising reinforcing fibers oriented generally at ±25 degrees with respect to the loading direction of the structural member;
      a third layer disposed on the second layer, the third layer comprising reinforcing fibers oriented generally at 90 degrees with respect to the loading direction of the structural member;
      a fourth layer disposed on the third layer, the fourth layer comprising reinforcing fibers oriented generally at ±30 degrees with respect to the loading direction of the structural member;
      a fifth layer disposed on the fourth layer, the fifth layer comprising reinforcing fibers oriented generally at 90 degrees with respect to the loading direction of the structural member; and
      a sixth layer disposed on the fifth layer, the sixth layer comprising reinforcing fibers oriented generally at ±45 degrees with respect to the loading direction of the structural member;
   wherein the structural member is configured to exhibit a non-linear stress-strain response when mechanically loaded to failure.

2. The structural member, according to claim 1, wherein the fiber-reinforced, organic matrix, composite material comprises:
   a plurality of one or more of carbon, graphite, glass, and aramid fibers.

3. The structural member, according to claim 1, wherein the fiber-reinforced, organic matrix, composite material comprises:
   a thermoplastic or thermosetting polymeric matrix.

4. The structural member, according to claim 3, wherein the thermoplastic or thermosetting polymeric matrix comprises:
   a poly-ether-ketone-ketone material.

5. The structural member, according to claim 1, wherein the fiber reinforced, organic matrix, composite material comprises a plurality of reinforcing fibers and substantially all of the plurality of reinforcing fibers are misaligned with a loading direction of the structural member.

6. The structural member, according to claim 1, wherein the plurality of layers comprises:
   a plurality of layers comprising reinforcing fibers; and
   a layer disposed between the plurality of layers comprising reinforcing fibers oriented generally at 90 degrees to a loading direction of the structural member.

7. The structural member, according to claim 1, wherein the structural member has a tubular form.

8. A helicopter landing gear, comprising:
   a pair of skids; and
   one or more cross members extending between the pair of skids, the one or more cross members comprising:

a plurality of layers of fiber-reinforced, organic matrix, composite material in which adjacent layers are bonded to one another, the plurality of layers having:
- a first, innermost layer comprising reinforcing fibers oriented generally at 90 degrees with respect to a loading direction of the structural member;
- a second layer disposed on the first layer, the second layer comprising reinforcing fibers oriented generally at ±25 degrees with respect to the loading direction of the structural member;
- a third layer disposed on the second layer, the third layer comprising reinforcing fibers oriented generally at 90 degrees with respect to the loading direction of the structural member;
- a fourth layer disposed on the third layer, the fourth layer comprising reinforcing fibers oriented generally at ±30 degrees with respect to the loading direction of the structural member;
- a fifth layer disposed on the fourth layer, the fifth layer comprising reinforcing fibers oriented generally at 90 degrees with respect to the loading direction of the structural member; and
- a sixth layer disposed on the fifth layer, the sixth layer comprising reinforcing fibers oriented generally at ±45 degrees with respect to the loading direction of the structural member;

wherein the one or more cross members are configured to exhibit non-linear stress-strain responses when mechanically loaded to failure.

9. The helicopter landing gear, according to claim 8, wherein the fiber-reinforced, organic matrix, composite material comprises:
- a plurality of one or more of carbon, graphite, glass, and aramid fibers.

10. The helicopter landing gear, according to claim 8, wherein the fiber-reinforced, organic matrix, composite material comprises:
- a thermoplastic or thermosetting polymeric matrix.

11. The helicopter landing gear, according to claim 10, wherein the thermoplastic or thermosetting polymeric matrix comprises:
- a poly-ether-ketone-ketone material.

12. The helicopter landing gear, according to claim 8, wherein the fiber reinforced, organic matrix, composite material comprises a plurality of reinforcing fibers and substantially all of the plurality of reinforcing fibers are misaligned with loading directions of the one or more cross members.

13. The helicopter landing gear, according to claim 8, wherein the plurality of layers comprises:
- a plurality of layers comprising reinforcing fibers; and
- a layer disposed between the plurality of layers comprising reinforcing fibers oriented generally at 90 degrees to loading directions of the one or more cross members.

14. The helicopter landing gear, according to claim 8, wherein the one or more cross members have tubular forms.

* * * * *